United States Patent [19]
Dampier et al.

[11] Patent Number: 4,940,605
[45] Date of Patent: Jul. 10, 1990

[54] ELECTRODE FOR ELECTROCHEMICAL CELL

[75] Inventors: Frederick W. Dampier, Watertown; Richard M. Mank, Needham, both of Mass.

[73] Assignee: Whittaker Technical Products, Inc., Pawcatuck, Conn.

[21] Appl. No.: 872,325

[22] Filed: Jun. 9, 1986

[51] Int. Cl.$^5$ .............................................. B05D 5/12
[52] U.S. Cl. .................................. 427/77; 427/126.9; 427/247; 427/369; 427/388.5
[58] Field of Search .................. 427/77, 126.1, 388.5, 427/369, 247; 429/101, 218, 217

[56] References Cited
U.S. PATENT DOCUMENTS

| | | | |
|---|---|---|---|
| 4,409,303 | 10/1983 | Bowden | 429/105 |
| 4,416,915 | 11/1983 | Palmer et al. | 427/126.1 |
| 4,499,160 | 2/1985 | Babqi et al. | 429/218 |
| 4,515,875 | 5/1985 | Bowden | 429/196 |

Primary Examiner—Janyce Bell
Attorney, Agent, or Firm—Donald E. Nist

[57] ABSTRACT

Method of making a flexible metal halide, specifically $CuCl_2$, positive electrode for a lithium/sulfur dioxide rechargeable electrochemical cell. $CuCl_2$ is mixed with graphite and a binder such as TFE. Methylene chloride or 1,1,2 trichlorotrifluoroethane is added to form a slurry. The slurry is pasted onto an inert, electrically-conductive, screen-like substrate. The slurry is dried and then heated to cure the TFE. The resulting electrode structure is pressed between rollers to reduce its thickness.

17 Claims, 1 Drawing Sheet

ELECTRODE FOR ELECTROCHEMICAL CELL

BACKGROUND OF THE INVENTION

This invention relates to electrochemical cells. More particularly, it is concerned with positive electrodes for rechargeable non-aqueous electrochemical cells.

Rechargeable non-aqueous electrochemical cells employing all inorganic sulfur dioxide electrolyte with lithium negative electrodes and metal halide positive electrodes have been developed. For so-called spiral wound cells, flexible positive electrodes are required. One method employed in fabricating flexible positive electrodes involves mixing the active material of the electrode with carbon and a suitable mechanical binder such as polytetrafluoroethlyene (TFE) in the form of an aqueous dispersion. The slurry formed by mixing the ingredients is applied to a metal screen-like substrate. This structure is pressed to remove the water, dried, and then heated to cure, or sinter, the binder.

One very useful active electrode material for use in the positive electrodes of rechargeable sulfur dioxide cells is cupric chloride ($CuCl_2$). Cupric chloride, however, is water soluble. If in order to overcome the problem of its solubility, a saturated aqueous solution of cupric chloride is used, the final dried electrode contains a non-uniform distribution of exceptionally large cupric chloride crystals rather than a uniform distribution of small crystals. Positive electrodes with large cupric chloride crystals do not provide satisfactory cell operation.

Positive electrodes using water-soluble metal halides, such as cupric chloride, typically are prepared by pressing the anhydrous powder of the active material together with carbon and a binder, such as TFE, onto a substrate. Positive electrodes produced by this pressed powder technique have been found to be inflexible and tend to crumble when attempts are made to bend them to form spiral wound electrode assemblies. Furthermore, the positive electrode expands and contracts during the operation of a rechargeable electrochemical cell causing additional stress to develop on the mechanical structure of the positive electrode.

SUMMARY OF THE INVENTION

An improved method of fabricating a flexible positive electrode for a rechargeable non-aqueous electrochemical cell is provided by the method in accordance with the present invention. The method comprises mixing a quantity of a metal halide active electrode material and a quantity of a conductive carbonaceous material to provide a mixture. A quantity of a mechanical binder which is inert in the electrochemical cell is added and mixed to provide a uniform mixture of the ingredients. A quantity of a non-aqueous liquid is added to the mixture. The liquid is such that the metal halide has a low solubility in the liquid and is inert with respect to the liquid whereby there is no chemical reaction between the metal halide and the liquid. The ingredients are mixed to provide a uniform, viscous slurry. The slurry is then pasted on an inert, electrically-conductive substrate. The pasted slurry is dried and cured for a time sufficient to remove substantially all of the liquid and to stabilize the mechanical binder thereby providing a positive electrode structure.

Figure 1:
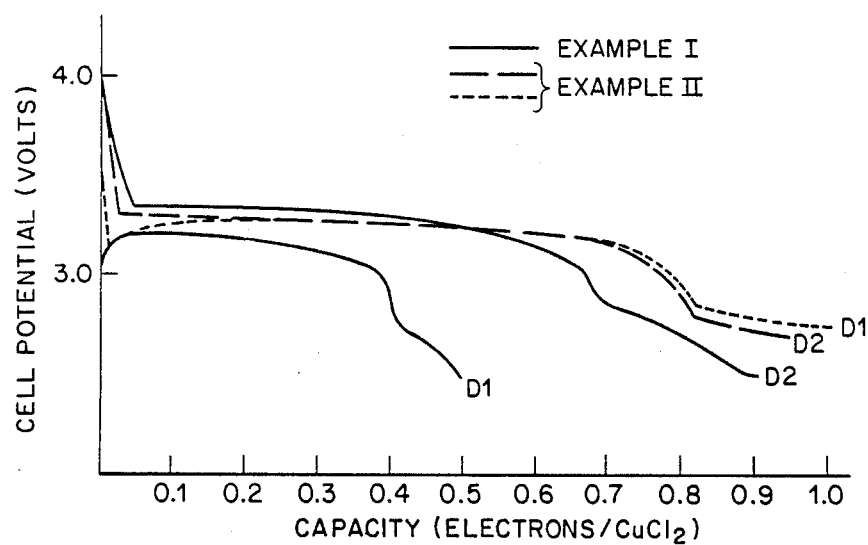
FIG. 1 illustrates discharge curves of a rechargeable non-aqueous electrochemical cell employing a positive electrode fabricated in accordance with the present invention and discharge curves of a similar electrochemical cell employing a positive electrode fabricated in accordance with previously known techniques.

For a better understanding of the present invention, together with other and further objects, advantages, and capabilities thereof, reference is made to the following disclosure and appended claims in connection with the above-described drawings.

DETAILED DESCRIPTION

Positive electrodes for use in rechargeable non-aqueous electrochemical cells are fabricated in accordance with the method of the present invention by in mixing together a metal halide active material, specifically anhydrous cupric chloride ($CuCl_2$), and a conductive carbonaceous material, specifically graphite. The mixture is 60 to 95 percent metal halide by weight. Mixing may be carried out in a ball mill for a period of at least 24 hours to pulverize and thoroughly mix the ingredients. The particle size of the cupric chloride crystals is reduced to less than 250 micrometers. Next, a suitable fluorocarbon polymer, such as TFE, in powder form for serving as a mechanical binder is added to the mixture. The binder constitutes from 2 to 10 percent by weight of the mixture. The ingredients may be mixed by hand with a spatula for a period of a few minutes.

Next, a quantity of a non-aqueous liquid in which the metal halide has a low solubility and with which the metal halide is chemically inert is added to the dry ingredients and mixed to form a uniform, viscous slurry. The slurry is pasted onto a substrate of an electrically-conductive material which is chemically inert to the ingredients of the cell. The substrate may be a screen-like member having interstices for receiving and supporting the slurry. The slurry is dried and then heated at a temperature of about 360° C. for about 20 minutes to cure the fluorocarbon binder and produce a mechanically secure electrode structure.

The method as described is of particular importance for the fabrication of cupric chloride positive electrodes which cannot be produced by employing known aqueous techniques. The method may also be employed in the fabrication of positive electrodes utilizing other metal halides as the active electrode material. More particularly materials such as nickel chloride ($NiCl_2$), silver chloride ($AgCl$), cobalt chloride ($CoCl_2$), and chromium chloride ($CrCl_3$) may be employed as the active material.

The non-aqueous liquids found to be most suitable are methylene chloride ($CH_2Cl_2$) and 1,1,2 trichlorotrifluoroethane ($ClF_2CCF_2Cl$). Anhydrous cupric chloride has been found to have a solubility of less than 0.15 weight percent in high purity methylene chloride with a water content of approximately 60 parts per million and less than 0.14 weight percent in 1,1,2 trichlorotrifluoroethane having a water content of about 70 parts per million. These two materials also have the requisite characteristic of being non-reactive with cupric chloride. In addition they are volatile and completely removed from the slurry by drying without decomposing. Other halogenated organic solvents which may be employed include 1,1,2 tetrachlorodifluoroethane ($CCl_2F$—$CCl_2F$); 1,1,1 trichlorotrifluoroethane ($CCl_3$—$CF_3$); 1,2 dichlorotrifluoroethane ($CHClF$—$CClF_2$); 1,2 dichlorodifluoroethane ($CH_2Cl$—$CClF_2$); trichloroethylene ($ClHC\!=\!CCl_2$); ethylene dichloride ($ClCH_2CH_2Cl$); and trichlorofluoromethane ($CCl_3F$).

The following examples are for the purpose of further illustrating and explaining the present invention, and are not to be taken as limiting the scope thereof.

EXAMPLE I

This example illustrates the performance of a rigid, pressed-powder, cupric chloride positive electrode typical of the prior art. The electrode contained a mixture of 60 percent by weight cupric chloride, 30 percent by weight graphite, and 10 percent by weight polyethylene binder. The mixed powders were hot pressed on an expanded nickel substrate. The substrate had previously been coated with a bonding layer of 70 percent by weight TFE, and 30 percent by weight carbon black about 10 $\mu$m thick.

The positive electrode was 2.0×3.0 cm and was 0.035 inch thick. The positive electrode and two negative electrodes of lithium 2.0×3.0 cm and 0.56 mm thick were separated by three layers of non-woven glass fiber separator paper 0.13 mm thick. The electrochemical cell was filled with 13 g of 1.03 M $LiGaCl_4$ in $SO_2$ as the electrolyte. The cell was discharged at 2.0 mA/cm$^2$ and charged between discharge cycles at a rate of 1 mA/cm$^2$ to a level of 4.2 volts. FIG. 1 shows the discharge curves for the first two discharge cycles.

EXAMPLE II

A flexible cupric chloride positive electrode was fabricated in accordance with the present invention by first mixing 20 g of anhydrous cupric chloride having a particle size of less than 250 $\mu$m with 10 g of graphite (Asbury, Grade 650) for 48 hours in a jar mill. The mixture of cupric chloride and graphite was removed from the mill and transferred to a beaker. 3.1 g of TFE (Teflon 7A manufactured by du Pont) sufficient to provide a mixture containing about 10 percent by weight TFE was added. The TFE was mixed with the cupric chloride-graphite mixture for several minutes with a spatula. Then approximately 47 g of anhydrous methylene chloride was added and the resulting slurry mixed to a uniform, viscous state.

The slurry was pasted on a screen-like grid member of expanded nickel which had previously been coated with an approximately 10 $\mu$m thick bonding layer of TFE and carbon. During the pasting operation the slurry was pressed through the screen-like member in a rapid operation so that both sides of the screen were pasted before the methylene chloride had an opportunity to evaporate. The methylene chloride was then allowed to evaporate after which the electrodes were pressed at 700 Kg/cm$^2$. The pressed electrodes with the dried slurry mixture were then sintered at approximately 340° C. for 15 to 20 minutes in air in order to cure the TFE, then the structure was cooled to room temperature. The initial thickness of the structure of approximately 0.030 inch was reduced to approximately 0.020 inch by passing through a pair of steel rollers with an outside diameter greater than 5.0 cm. The resulting electrode structure was sufficiently flexible so that it could be wound around a 0.125 inch diameter mandrel, unwound, and then flattened out with no signs of delamination, cracking, or crumbling.

To fabricate a positive electrode a sheet of the foregoing material 2×3 cm was cut and a lead wire attached. An electrochemical cell employing the positive electrode as described and other constituents identical to those of Example I was constructed and then cycled in the same manner as the cell of Example I. The discharge curves of the cell for the first and second discharges are illustrated in FIG. 1. The greater capacity of the cell containing the positive electrode fabricated in accordance with the method of the invention to a much higher end of discharge cut-off potential demonstrates its superior performance.

EXAMPLE III

Figure 2:
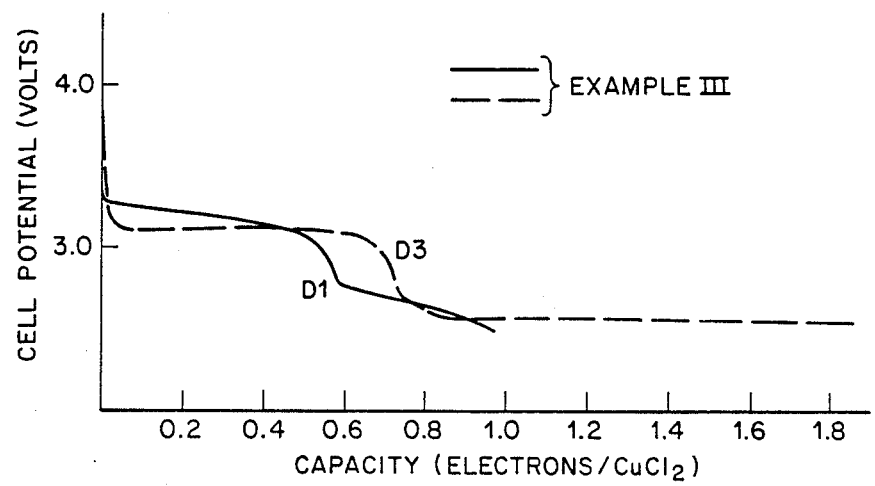
FIG. 2 illustrates discharge curves for a rechargeable non-aqueous electrochemical cell employing a positive electrode fabricated in accordance with the present invention.

A cupric chloride positive electrode was fabricated in accordance with the present invention employing the procedures described in Example II with 1,1,2 trichlorotrifluoroethane as the non-aqueous liquid in place of methylene chloride. The cupric chloride positive electrodes produced were flexible enough so that they also could be wound on a 0.125 inch mandrel and then unwound and flattened with no sign of delamination, cracking, or crumbling. An electrochemical cell employing a positive electrode fabricated in this manner and otherwise similar to the cells of Examples I and II was repeatedly discharged and charged the same as the cells of Examples I and II. FIG. 2 illustrates the first and third discharge curves for this cell.

Metal halide positive electrodes for rechargeable non-aqueous electrochemical cells fabricated in accordance with the method of the present invention exhibit improved mechanical properties over pressed-powder electrodes. The electrodes are flexible and suitable for use in cells having spiral-wound electrode assemblies and in high rate cells. These electrodes are better able to withstand the stresses of expansion and contraction occurring repeatedly during discharge and charge cycles. As indicated by the illustrative examples and accompanying graphs of discharge curves, good performance is obtained from rechargeable cells employing positive electrodes fabricated in accordance with the present invention.

While there has been shown and described what are considered preferred embodiments of the present invention, it will be obvious to those skilled in the art that various changes and modifications may be made therein without departing from the invention as defined by the appended claims.

What is claimed is:

1. The method of fabricating a flexible positive electrode for a rechargeable non-aqueous electrochemical cell comprising the steps of mixing a quantity of a metal halide active electrode material and a quantity of a conductive carbonaceous material to provide a mixture consisting essentially of the metal halide and the conductive carbonaceous material, the metal halide being selected from the group consisting of cupric chloride, nickel, chloride, silver chloride, cobalt chloride and chromium chloride;

adding a quantity of a mechanical binder which is inert in the electrochemical cell to the mixture;

mixing to provide a uniform mixture of the ingredients;

adding a quantity of non-aqueous liquid which is a volatile halogenated organic solvent to the mixture, said metal halide having a low solubility in the liquid and being inert with respect to the liquid whereby there is no chemical reaction between the metal halide and the liquid;

mixing to provide a uniform, viscous slurry consisting essentially of the metal halide, the conductive carbonaceous material, the mechanical binder, and the non-aqueous liquid; pasting the slurry on an inert, electrically-conductive substrate;

drying the pasted slurry; and curing the dried slurry for a time sufficient to remove substantially all of the liquid and to stabilize the mechanical binder thereby providing a positive electrode structure.

2. The method in accordance with claim 1 wherein said non-aqueous liquid is selected from the group consisting of methylene chloride; 1,1,2 trichlorotrifluoroethane; 1,1,2 tetrachlorodifluoroethane; 1,1,1-trichlorotrifluoroethane; 1,2dichlorotrifluoroethane; 1,2dichlorodifluoroethane; trichloroethylene; ethylene dichloride; and trichlorofluoromethane; wherein said metal halide is anhydrous cupric chloride and wherein the mixture thereof with the conductive carbonaceous material includes from 60 to 95 percent by weight of the cupric chloride.

3. The method in accordance with claim 2 wherein said non-aqueous liquid is selected from the group consisting of methylene chloride and 1,1,2 trichlorotrifluoroethane.

4. The method in accordance with claim 3 wherein said carbonaceous material is graphite.

5. The method in accordance with claim 4 wherein said inert, electrically-conductive substrate is a screen-like member; and pasting the slurry includes pressing the slurry into the screen-like member so that the slurry substantially fills the interstices therein with the slurry supported by the interstice-defining screen-like member.

6. The method in accordance with claim 2 including subsequent to the step of curing pressing the positive electrode structure to reduce its thickness.

7. The method in accordance with claim 6 wherein said substrate has previously been coated with a bonding layer of carbon and a mechanical binder.

8. The method in accordance with claim 1 wherein the mixture of the metal halide and the conductive carbonaceous material includes from 60 to 95 percent by weight metal halide.

9. The method in accordance with claim 8 wherein said metal halide is anhydrous cupric chloride.

10. The method in accordance with claim 8 wherein the mechanical binder which is added to the mixture of cupric chloride and graphite is a fluorocarbon polymer.

11. The method in accordance with claim 10 wherein the mixture of cupric chloride, graphite, and fluorocarbon polymer includes from about 2 to 10 percent by weight fluorocarbon polymer.

12. The method of fabricating a flexible positive electrode for a rechargeable non-aqueous electrochemical cell comprising the steps of mixing a quantity of anhydrous cupric chloride and a quantity of graphite to provide a mixture consisting essentially of anhydrous cupric chloride and graphite;

adding a quantity of a mechanical binder which is inert in the electrochemical cell to the mixture;

mixing to provide a uniform mixture of the ingredients;

adding a quantity of methylene chloride or 1,1,2 trichlorotrifluoroethane to the mixture;

mixing the ingredients to provide a uniform, viscous slurry consisting essentially of anhydrous cupric chloride, graphite, the mechanical binder, and methylene chloride or 1,1,2 trichlorotrifluoroethane;

pressing the slurry onto a substrate of an inert electrically-conductive screen-like member;

drying the pressed slurry; and curing the dried slurry for a time sufficient to remove substantially all of the methylene chloride or 1,1,2 trichlorotrifluoroethane and to stabilize the mechanical binder thereby providing a positive electrode structure.

13. The method in accordance with claim 12 wherein the mixture of cupric chloride and graphite includes from 60 to 95 percent by weight cupric chloride.

14. The method in accordance with claim 13 including subsequent to the step of curing pressing the positive electrode structure to reduce its thickness.

15. The method in accordance with claim 14 wherein said substrate has previously been coated with a bonding layer of carbon and a mechanical binder.

16. The method in accordance with claim 13 wherein the mechanical binder which is added to the mixture of cupric chloride and graphite is a fluorocarbon polymer.

17. The method in accordance with claim 16 wherein the mixture of cupric chloride, graphite, and fluorocarbon polymer includes from about 2 to 10 percent by weight fluorocarbon polymer.

* * * * *